(No Model.)

W. GERHARD.
CHAIN LINK.

No. 261,544.  Patented July 25, 1882.

Attests  Inventor
 William Gerhard
 By his atty

UNITED STATES PATENT OFFICE.

WILLIAM GERHARD, OF PHILADELPHIA, PENNSYLVANIA.

CHAIN-LINK.

SPECIFICATION forming part of Letters Patent No. 261,544, dated July 25, 1882.

Application filed February 25, 1882. (No model.)

*To all whom it may concern:*

Be it known that I, WILLIAM GERHARD, of the city and county of Philadelphia, and State of Pennsylvania, have invented an Improved Chain-Link, of which the following is a specification.

The object of my invention is to make a chain which will have the strength and wearing qualities of steel without its liability to sudden fracture, and in which the links shall be more readily and securely welded than has been found practicable with links of steel.

My invention accordingly consists in making the links of my chain of steel covered with iron, the two materials being thoroughly welded together, so as to form a solid mass, and which is generally known as "combined iron and steel."

I have found that chains made from bars or rods of this material have greater tensile strength and wearing quality than chains made of iron, and are at the same time less liable to sudden fracture, and its links are more easily welded than steel chains. By inclosing the steel center with a coating of iron, as specified, the links made therefrom may be welded without the use of a flux.

Figure 1:
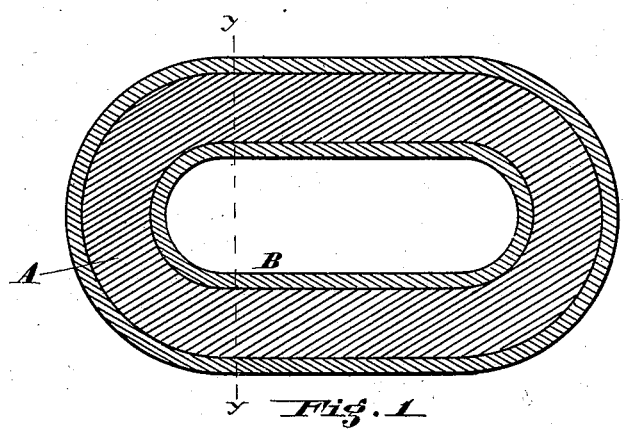
Figure 2:
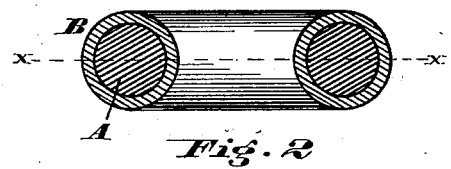

In the drawings, Figure 1 is a section of my improved link for chains on line $x\,x$, and Fig. 2 is a cross-section of same on line $y\,y$.

A is the steel center, and may be made of any desired shape in cross-section, the round form being preferred. B is the iron coating or casing. This form of combined iron and steel is first made into bars, is then cut off into the desired lengths, which are bent into links, and the ends are welded together to form a continuous body, as shown.

Having now described my invention, what I claim as new, and desire to secure by Letters Patent, is—

As an article of manufacture, a chain-link made of steel covered with iron, the iron and steel being welded together to form a solid link, substantially as and for the purpose specified.

In testimony of which invention I hereunto set my hand this 23d day of February, A. D. 1882.

WM. GERHARD.

Witnesses:
H. DU PONT GERHARD,
A. J. D. DIXON.